Figure 1:
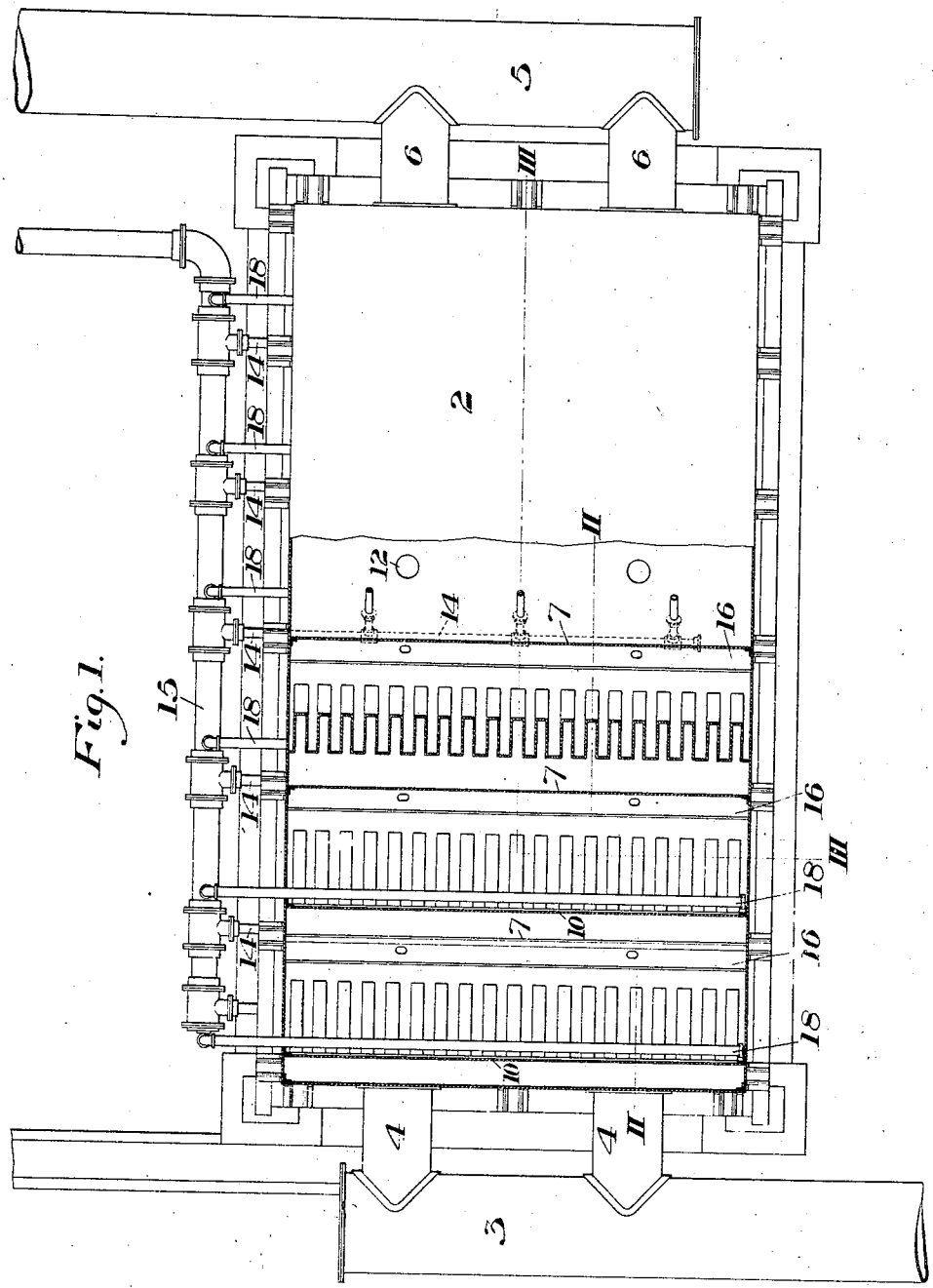

No. 886,304. PATENTED APR. 28, 1908.
F. H. MOYER.
GAS WASHER.
APPLICATION FILED MAY 16, 1907. RENEWED FEB. 11, 1908.

3 SHEETS—SHEET 1.

WITNESSES

INVENTOR

No. 886,304. PATENTED APR. 28, 1908.
F. H. MOYER.
GAS WASHER.
APPLICATION FILED MAY 16, 1907. RENEWED FEB. 11, 1908.
3 SHEETS—SHEET 2.
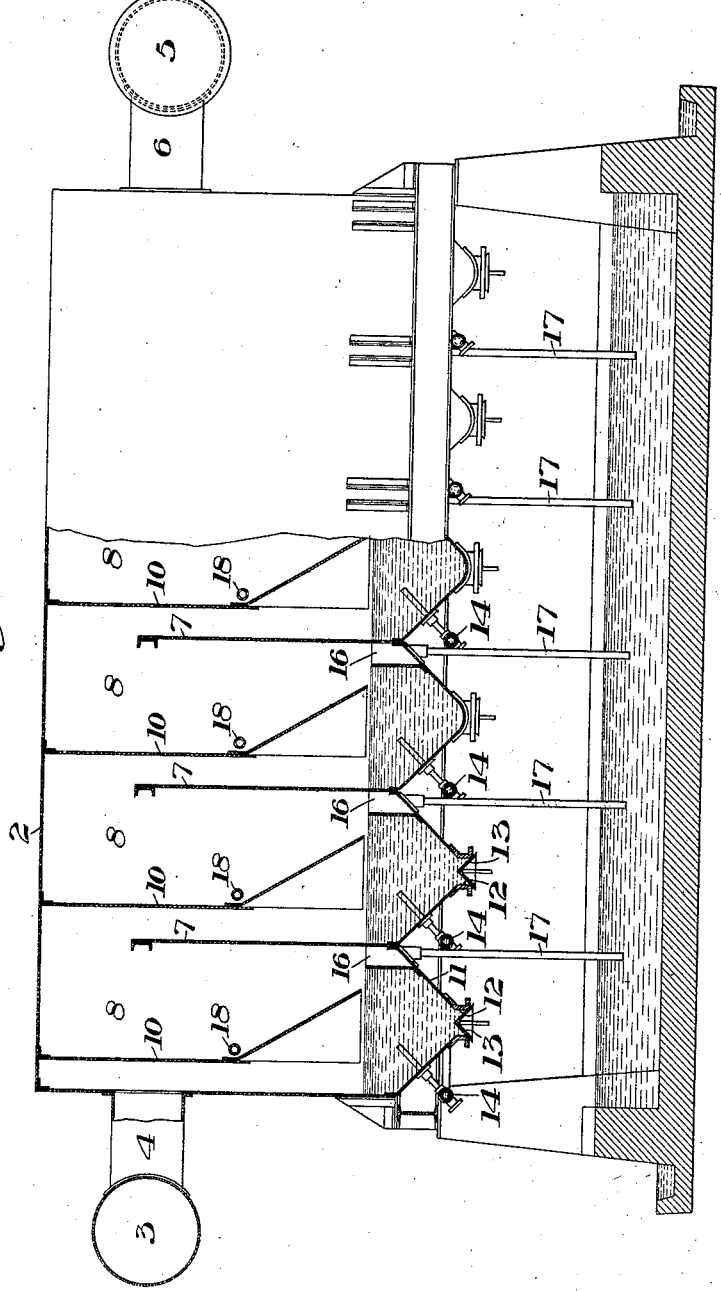
WITNESSES
INVENTOR No. 886,304. PATENTED APR. 28, 1908.
F. H. MOYER.
GAS WASHER.
APPLICATION FILED MAY 16, 1907. RENEWED FEB. 11, 1908.
3 SHEETS—SHEET 3.
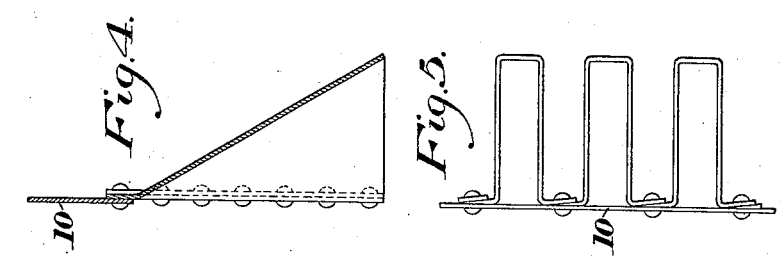
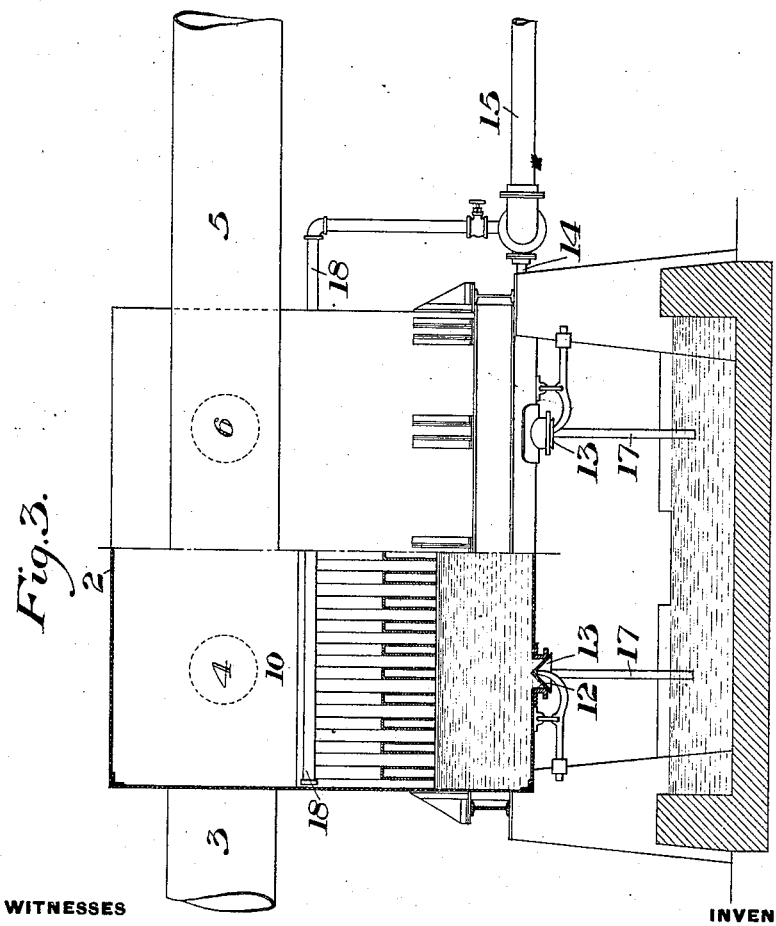
WITNESSES
INVENTOR

UNITED STATES PATENT OFFICE.

FREDELLIA H. MOYER, OF CLAIRTON, PENNSYLVANIA.

GAS-WASHER.

No. 886,304.  Specification of Letters Patent.  Patented April 28, 1908.

Application filed May 16, 1907, Serial No. 374,094. Renewed February 11, 1908. Serial No. 415,370.

*To all whom it may concern:*

Be it known that I, FREDELLIA H. MOYER, of Clairton, Allegheny county, Pennsylvania, have invented a new and useful Gas-Washer, of which the following is a full, clear, and exact description, reference being had to the accompanying drawings, forming part of this specification, in which—

Figure 1 is a plan view, partly in horizontal cross section; Fig. 2 is a side elevation partly in vertical cross section on the line II—II of Fig. 1; Fig. 3 is an end elevation partly in section on the line III—III of Fig. 1; Figs. 4 and 5 are detail views on a larger scale, showing the construction of the irregular lower end portions of the depending partitions in the washer.

This apparatus is of the same general type as the gas washer shown in my pending application, Serial No. 360,029, filed March 1, 1907 and it is designed for use in locations where the circular construction shown in the pending application or other reasons make the use of that form undesirable.

The invention relates to apparatus employed in cleaning gases by removing finely divided solid impurities carried in suspension in the gases and the object of the invention is to provide an improved form of gas washer having means by which the gases are spread into a flat thin sheet, so as to bring the largest possible surface of the gases into contact with the fluid contained in the washer.

Another object of my invention is to provide improved means for introducing and re-removing fluid in the washer by the use of which any foreign matter on the surface of the fluid is continuously removed as it is formed and choking or clogging of the passages for the gases is prevented.

It further consists in providing a gas washer which can be used as a dry dust catcher by shutting off the fluid supply and removing the fluid in the lower portion of the washer without stopping or retarding the flow of the gases through the apparatus in changing the washer into a dust catcher, or vice versa.

In the drawings, 2 represents the rectangular shell of a washer and 3 the gas inlet pipe, this pipe being provided as shown with two branch inlet pipes 4 each connecting the inlet pipe 3 with the end of the vessel 2. A gas outlet pipe 5 is also connected by two gas outlet branch pipes 6 with the opposite end of the shell 2 of the washer. One or more branch pipes may be used to connect the gas washer with the gas supply and with the gas outlet pipe.

The interior of the shell 2 is divided by upwardly extending partitions 7 into a series of chambers 8, these chambers being in communication with each other by the passages formed between the top of the shell 2 of the vessel and the top of the partition 7. Each of the chambers 8 is provided as shown with a depending partition 10, these partitions extending from the top of the shell 2 to within a short distance of the level of the liquid in the washer.

Each of the chambers or compartments 8 is preferably provided with a sloping bottom 11 and with a cleaning opening 12 which is normally closed by means of a bell 13. As shown in the drawings, the partitions 7 which divide the vessel into compartments extend downwardly and are connected to the flanged bottoms of adjoining compartments. Instead of this construction, these partitions may extend downwardly to a point sufficiently below the level of the liquid in the washer to shut off communication from one compartment 8 to the adjoining compartment 8 between the lower end of the partitions 7 and the surface of the liquid in the washer. Each of the compartments 8 is provided with a fluid inlet pipe 14, these pipes 14 being connected to a common supply pipe 15. Each of the compartments 8 is also provided with a fluid overflow trough or funnel 16 into which the fluid flows from the washer and carries any foreign matter floating on the surface of the fluid out of the washer and out of the path of the incoming gases. A seal for the fluid overflow openings is provided by means of the overflow pipes 17 which extend downwardly from the trough or funnels 16 to a point below the level of the fluid in the pool of fluid which is maintained below the chamber 2.

The lower end of each of the depending partitions 10 is provided with a crimped or fluted end portion which is constructed so as to provide a passage between the end of the partition and the surface of the fluid, having an irregular contour in a plane parallel with the surface of the fluid in the washer. By so forming the lower end of the partitions 10 I am enabled to cause the gases to pass between these partitions 10 and the surface of the fluid in the washer in a flat thin sheet and still provide a passage of sufficient area to not retard the passage of the gases through the different compartments of the washer. In each of the compartments 8 is a spray pipe 18 by means of which fluid is sprayed on the surface of the fluted lower end portions of the partitions 10, in this way bringing the fluid into more intimate contact with the gases and thereby removing a larger amount of the solid impurities in the gases than would otherwise be effected.

Preferably the washer is provided with a series of compartments in each of which a separate pool of liquid is maintained, although one pool may be employed in which case the vertically extending partitions 7 will be below the level of the liquid in the washer, a sufficient distance to prevent passage of the gases between the lower end of these partitions and the surface of the liquid.

When the gases are impinged on the surface of the liquid in the first compartment, the major amount of the impurities will be removed and when the separate pools are maintained, the first of these compartments may be cleaned more frequently than the others, in this way reducing the amount of fluid necessary to be removed to keep the apparatus in condition.

In the operation of my improved washer the gases from the inlet pipe 3 enter the vessel 2 through the branch inlet pipes 4 and are deflected downwardly by contact with the partition 10 and are caused to flow downwardly and impinge on the surface of the liquid in the first of the compartments 8. The gases are spread into a flat thin sheet in passing between this partition and the surface of the liquid and then rise upwardly on the opposite side of the partition 10 in the first compartment. The gases then pass through the communicating passage formed by the top of the washer 2 and the top of the upwardly projecting partition 7 and are then deflected downwardly by the next partition 10 being again spread into a flat thin sheet and caused to again impinge on the fluid in the washer. The operation as thus described is carried out in each of the succeeding chambers, of which there may be any desired number.

Contact of the hot gases with the liquid in the washer will vaporize a portion of this liquid and this vapor coming into contact with the particles of finely divided solid matter carried in suspension in the gases will form a scum which will float on the surface of the liquid. By providing a constantly changing supply of fluid used in washing in the apparatus the fluid is constantly flowing into the fluid overflow outlets. This overflow carries the scum as it is formed from the surface of the liquid into the outlets and downwardly through the pipes into the pool of liquid beneath the washer and in this way choking or clogging of the passages is prevented.

The apparatus may be provided with a refractory lining when desired.

Modifications in the shape and arrangement of the apparatus may be made without departing from my invention.

I claim:—

1. Apparatus for cleaning gases comprising a vessel having gas inlet and outlet openings, liquid inlet and overflow outlet openings, said overflow being arranged to maintain the liquid at a certain level and a downwardly projecting partition in said vessel, the lower end of the partition being fluted or irregular in contour and terminating above the level of the overflow outlet; substantially as described.

2. Apparatus for cleaning gases comprising a vessel having gas inlet and outlet openings, liquid inlet and overflow outlet openings, said overflow being arranged to maintain the liquid at a certain level and a downwardly projecting partition in said vessel, the lower end of the partition being fluted or irregular in contour and terminating above the level of the overflow outlet and a water seal for the liquid overflow; substantially as described.

3. Apparatus for cleaning gases comprising a vessel having gas inlet and outlet openings, liquid inlet and overflow openings, said overflow being arranged to maintain the liquid at a certain level, upwardly extending partitions dividing said vessels into compartments and terminating below the top of said vessel to afford communication between said compartments and a downwardly projecting partition in each compartment, the lower ends of the downwardly projecting partitions being fluted or irregular in contour and terminating above the level of the overflow outlet; substantially as described.

4. Apparatus for cleaning gases comprising a vessel having inlet and outlet openings for the gases, inlet and overflow outlet openings for the liquid, said overflow outlet opening being arranged to maintain a constant level for the liquid in the vessel and a downwardly extending partition in the vessel, the lower end of the partition being fluted or irregular in contour and terminating above the level of the overflow outlet; substantially as described.

5. Apparatus for cleaning gases comprising a vessel having inlet and outlet openings for the gases, inlet and overflow outlet openings for the liquid, said overflow outlet opening being arranged to maintain a constant level for the liquid in the vessel, a downwardly extending partition in the vessel, the lower end of the partition being fluted or irregular in contour and terminating above the level of the overflow outlet, and a spray device arranged to spray said fluted partition with liquid; substantially as described.

6. Apparatus for cleaning gases comprising a vessel having inlet and outlet openings for the gases, inlet and overflow outlet openings for the liquid, said overflow outlet opening being arranged to maintain a constant level for the liquid in the vessel, a downwardly extending partition in the vessel, the lower end of the partition being fluted or irregular in contour and terminating above the level of the overflow outlet, a pool of liquid beneath the vessel and a pipe extending below the level of the liquid in the pool from the fluid overflow outlet; substantially as described.

7. Apparatus for cleaning gases comprising a vessel having gas inlet and outlet openings, liquid inlet and outlet openings, the outlet opening being arranged to maintain liquid at a certain level said liquid inlet opening being arranged to create a current in the liquid toward the overflow outlets and cause the scum on top of the liquid to flow into said overflow outlet and a downwardly projecting partition in said vessel, the lower end of the partition being corrugated and terminating above the level of the liquid outlet; substantially as described.

8. Apparatus for cleaning gases comprising a vessel having gas inlet and outlet openings, liquid inlet and overflow openings, said overflow openings being arranged to maintain the liquid at a certain level, said liquid inlet openings being arranged to create a current in the liquid toward the overflow outlets and cause the foreign materials on top of the liquid to flow into the said overflow outlets upwardly extending partitions dividing said vessel into compartments and terminating below the top of said vessel to afford communication between said compartments and a downwardly projecting partition in each compartment, the lower ends of the downwardly projecting partitions being of irregular contour and terminating above the level of the overflow outlet; substantially as described.

In testimony whereof, I have hereunto set my hand.

FREDELLIA H. MOYER.

Witnesses:
R. D. LITTLE,
GEO. B. BLEMING.